US008675793B2

(12) United States Patent
Cho et al.

(10) Patent No.: US 8,675,793 B2
(45) Date of Patent: Mar. 18, 2014

(54) MIMO COMMUNICATION SYSTEM AND CONTROL METHOD THEREOF

(75) Inventors: Jeong Hoon Cho, Seoul (KR); Ja Kwon Ku, Seoul (KR); Kyung Suk Kim, Seoul (KR); Gil Sang Yoon, Seoul (KR); Jeong Hwan Lee, Seoul (KR); In Tae Hwang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 121 days.

(21) Appl. No.: 13/059,675

(22) PCT Filed: Aug. 20, 2009

(86) PCT No.: PCT/KR2009/004647
§ 371 (c)(1),
(2), (4) Date: May 11, 2011

(87) PCT Pub. No.: WO2010/021501
PCT Pub. Date: Feb. 25, 2010

(65) Prior Publication Data
US 2011/0211657 A1 Sep. 1, 2011

(30) Foreign Application Priority Data

Aug. 20, 2008 (KR) .................. 10-2008-0081227
Sep. 26, 2008 (KR) .................. 10-2008-0094413

(51) Int. Cl.
*H04B 7/10* (2006.01)
*H04L 1/02* (2006.01)

(52) U.S. Cl.
USPC ........................................ 375/347; 375/340

(58) Field of Classification Search
USPC ......... 375/224, 259–260, 267, 285, 295–296, 375/299, 316, 347, 348
See application file for complete search history.

(56) References Cited

U.S. PATENT DOCUMENTS 7,103,325 B1    9/2006  Jia et al.
7,623,587 B2 *  11/2009 Shim et al. ................ 375/267
(Continued)

FOREIGN PATENT DOCUMENTS

CN          1574687 A      2/2005
KR   10-2003-0069299 A     8/2003
(Continued)

OTHER PUBLICATIONS

European Search Report dated Aug. 8, 2011 in International Patent Application PCT/KR2009/004647, filed Aug. 20, 2009.

(Continued)

*Primary Examiner* — Jean B Corrielus
(74) *Attorney, Agent, or Firm* — Saliwanchik, Lloyd & Eisenschenk

(57) ABSTRACT

Disclosed are a MIMO communication system and a method of controlling the same. The MIMO communication system includes an MCS (modulation and coding scheme) level selector for selecting an MCS level representing combination of data modulation and coding schemes according to a channel status, a modulation and coding section for processing transmit data according to modulation and coding schemes corresponding to the selected MCS level, a D-STTD (double-space time transmit diversity) encoder for coding the transmit data, which has been processed through the modulation and coding section, through a D-STTD scheme and transmitting the transmit data through M transmit antennas, and a receiver for receiving data, which have been coded through the D-STTD scheme, through N receive antennas, detecting the received data through an OSIC-MMSE (ordered successive interference cancellation-minimum mean-square error) scheme, and decoding the received data through the modulation and coding schemes employed in the modulation and coding section.

15 Claims, 8 Drawing Sheets

(56) References Cited

U.S. PATENT DOCUMENTS

| | | | |
|---|---|---|---|
| 2003/0063654 A1* | 4/2003 | Onggosanusi et al. | 375/130 |
| 2003/0228850 A1* | 12/2003 | Hwang | 455/101 |
| 2004/0081073 A1 | 4/2004 | Walton et al. | |
| 2004/0116077 A1* | 6/2004 | Lee et al. | 455/101 |
| 2004/0165552 A1* | 8/2004 | Kim | 370/329 |
| 2005/0031050 A1* | 2/2005 | Kim et al. | 375/267 |
| 2005/0031062 A1* | 2/2005 | Shim et al. | 375/347 |
| 2005/0265475 A1 | 12/2005 | Sun et al. | |
| 2008/0045212 A1* | 2/2008 | Kim et al. | 455/435.1 |
| 2008/0159426 A1* | 7/2008 | Jung et al. | 375/260 |
| 2009/0310701 A1* | 12/2009 | Shim et al. | 375/267 |
| 2010/0185777 A1* | 7/2010 | Kim et al. | 709/231 |

FOREIGN PATENT DOCUMENTS

| | | |
|---|---|---|
| WO | WO-2005/069505 A1 | 7/2005 |
| WO | WO-2006/076697 A2 | 7/2006 |

OTHER PUBLICATIONS

Hyounkuk Kim, et al., "Efficient Successive Interference Cancellation Algorithms for the DSTTD System", 2005 IEEE International Symposium on Personal, Indoor and Mobile Radio Communications, Sep. 11-14, 2005, pp. 62-66.

Sungkyu Jung, et al., "Low Complexity ML Based Interference Cancellation for Layered Space-Time Codes", 2008 Vehicular Technology Conference, May 11-14, 2008, pp. 579-583.

Keun Chul Hwang, et al., "Iterative Joint Detection and Decoding for MIMO-OFDM Wireless Communications", 2006 Fortieth Asilomar Conference on Signals, Systems, and Computers, Oct. 29-Nov. 1, 2006, pp. 1752-1758.

* cited by examiner

MIMO COMMUNICATION SYSTEM AND CONTROL METHOD THEREOF

CROSS-REFERENCE TO RELATED APPLICATION

This application is the U.S. national stage application of International Patent Application No. PCT/KR2009/004647, filed Aug. 20, 2009, which claims priority to Korean Application Nos. 10-2008-0081227, filed Aug. 20, 2008, and 10-2008-0094413, filed Sep. 26, 2008, the disclosures of each of which are incorporated herein by reference in their entirety.

TECHNICAL FIELD

The present invention relates to a multiple input multiple output communication system and a method of controlling the same.

BACKGROUND ART

Recently, studies and researches have been actively carried out with respect to a MIMO (Multiple Input Multiple Output) system.

MIMO technologies are classified into diversity and multiplexing technologies. The diversity technology includes a STC (Space-Time coding) technology configured to obtain a space-time diversity gain by using multiple transceive antennas. The multiplexing technology includes a BLAST (Bell-Lab Layered Space-Time) technology to transmit different data to each transmit antenna. In addition, recently, a D-STTD (Double-Space Time Transmit Diversity) technology has been developed to obtain both effects of the diversity and multiplexing technologies.

The D-STTD technology is the combination of spatial multiplexing and STTD technologies, and employs two STBCs (Space-Time Block Codes) for a pair of antennas. According to the D-STTD technology, after forming two symbol sequences through spatial multiplexing, a pair of antennas are allocated to each symbol sequence and then the STTD scheme is applied. Therefore, in order to apply the spatial multiplexing and the STTD technologies, the total four transmit antennas are required, and at least two receive antennas are required to detect spatial-multiplexed symbols. In the D-STTD technology, since four symbols are transmitted for the duration of two symbols, the throughput the same as that of the spatial multiplexing technology employing two transmit antennas can be obtained. In addition, since two pairs of antennas are used in the STTD technology, the transmission diversity gain the same as that of the conventional STTD can be obtained.

Therefore, various methods to enhance data transmission/reception efficiency are required in a system with the D-STTD technology.

DISCLOSURE

Technical Problem

The embodiment provides a multiple input multiple output communication system capable of ensuring the effective throughput according to the variation of the channel environment and a method of controlling the same.

The embodiment provides a method of controlling a multiple input multiple output communication system capable of ensuring high-speed transmission effect of a great amount of data.

Technical Solution

According to the embodiment, a multiple input multiple output communication system includes an MCS (modulation and coding scheme) level selector for selecting an MCS level representing combination of data modulation and coding schemes according to a channel status, a modulation and coding section for processing transmit data according to modulation and coding schemes corresponding to the selected MCS level, and a D-STTD (double-space time transmit diversity) encoder for coding the transmit data, which has been processed through the modulation and coding section, through a D-STTD scheme and transmitting the transmit data through M transmit antennas.

Advantageous Effects

According to the embodiment, a transfer rate can be effectively ensured according to channel environments.

According to the embodiment, a great amount of data can be transferred at a high speed.

MODE FOR INVENTION

Hereinafter, a multiple input multiple output system (MIMO) and a method of controlling the same according to the embodiment will be described in detail with respect to accompanying drawings.

The MIMO system according to the embodiment supports a plurality of modulation schemes and a plurality of coding rates according to MCS (Modulation and Coding Scheme) levels of an AMC (Adoptive Adaptive Modulation and Coding) schemes. The combination of the coding rates and the modulation schemes is referred to as an MCS (Modulation and Coding Scheme). A plurality of MCS levels having the first level to the $N^{th}$ level can be defined according to the number of MCSs.

Following table 1 shows MCS levels according to HSDPA (High-Speed Downlink Packet Access) and the standard of a 3G LTE.

TABLE 1

| MCS Level | Data rate (kbps) | Bit number per frame | Code rate | Modulation Schemes | Throughput (15 codes) |
|---|---|---|---|---|---|
| 1 | 180.0 | 1800 | 1/3 | QPSK | 2.7 Mbps |
| 2 | 360.0 | 3600 | 1/2 | QPSK | 5.4 Mbps |
| 3 | 536.0 | 5360 | 1/2 | 16 QAM | 8.0 Mbps |
| 4 | 720.0 | 7200 | 1/2 | 64 QAM | 10.8 Mbps |

As shown in Table 1, as an MCS level is increased from the MCS level 1 (QPSK, turbo code: 1/3) to the MCS level 4 (64QAM, turbo code: 1/2), the MCS level is allocated with a higher-order modulation scheme and a higher coding rate. The higher-order modulation scheme and the higher coding rate represent the throughput superior to that of a lower-order modulation scheme and a lower coding rate. However, the lower-order modulation scheme and the lower coding rate represent a lower error rate. Therefore, when a channel is in a good status, the higher-order modulation scheme and the higher coding rate (e.g., MCS level 4) can be selected. When the channel is in a degraded status, the lower-order modulation scheme and the lower coding rate (e.g., MCS level 1) may be selected.

The channel status may be estimated according to an SNR (Signal to Noise Ratio). According to the embodiment, the MCS level may be applied according to an SNR range. For example, if the SNR is in the range of about −10 dB to about −5 dB, the MCS level 1 can be applied. If the SNR is at least +10 dB, the MCS level 4 can be applied. The criterion to setting the MCS level may be variously determined depending on systems.

Figure 1:
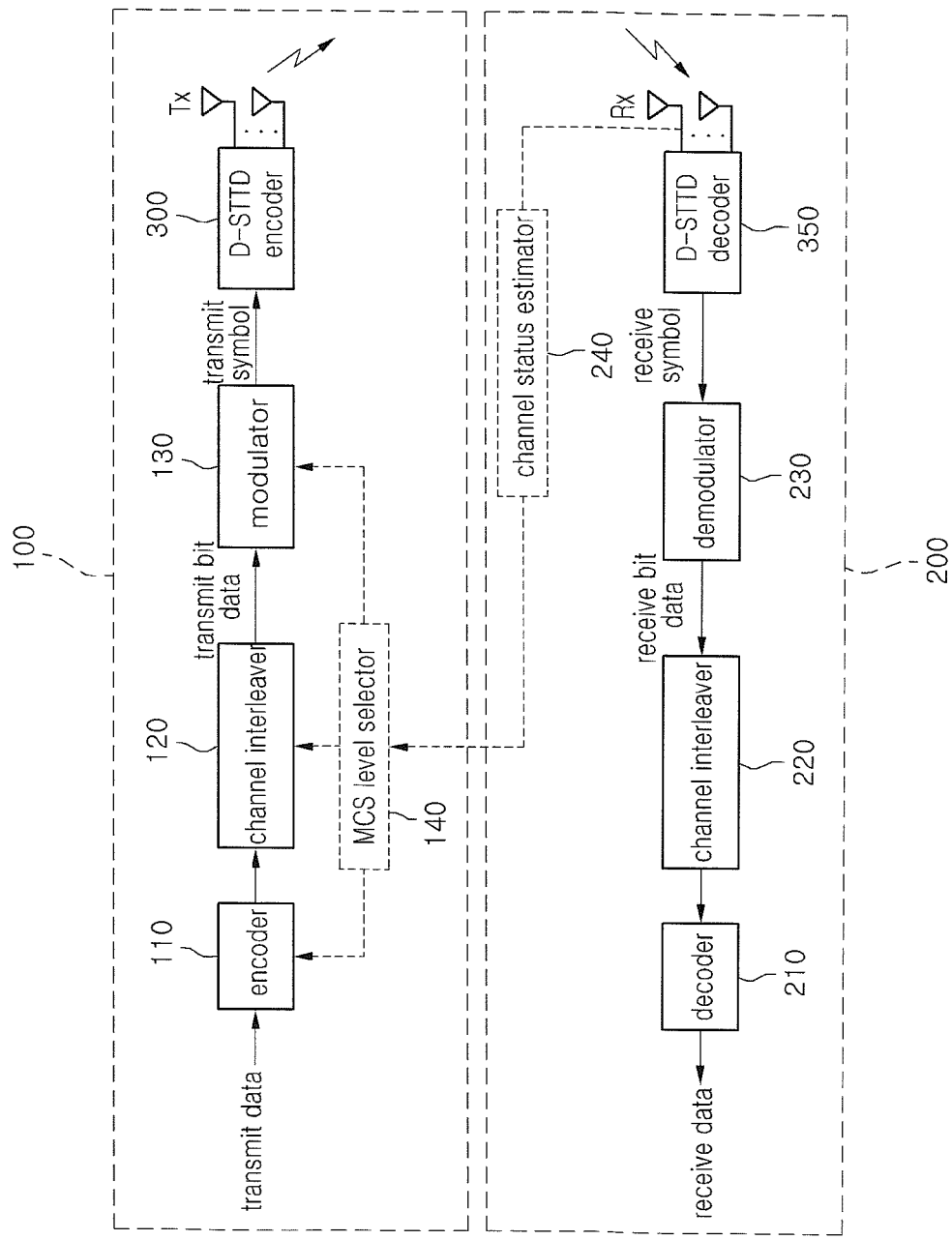
FIG. 1 is a control block diagram showing a MIMO system according to the embodiment.

FIG. 1 is a control block diagram showing the MIMO system according to the embodiment.

As shown in FIG. 1, the embodiment includes a receiver 200 for decoding a receive signal through a D-STTD (Double-Space Time Transmit Diversity) scheme to estimate a forward channel and a transmitter 100 for selecting an MCS level according to the forward channel status estimated in the receiver 200, coding and modulating transmit data of the forward channel according to the MCS level, and then transmitting transmit symbols to each transmit antenna through D-STTD coding. In this case, the receiver 200 may be positioned in a mobile terminal, and the transmitter 100 may be positioned in a base station.

The receiver 200 includes a D-STTD decoder 350 for decoding receive symbols received through N receive antennas Rx through a D-STTD scheme, a channel status estimator 240 for estimating a signal to noise ratio (SNR) with respect to the forward channel status by using the receive symbols that has been D-STTD decoded, a demodulator 230 for demodulating the receive symbols that has been D-STTD decoded, a channel de-interleaver 220 for performing channel de-interleaving with respect to receive bit data that has been demodulated, and a decoder 210 for decoding the bit data, which have been subject to the channel de-interleaving, to output receive data.

The transmitter 100 includes an MCS level selector 140 for selecting an MCS level according to the information about the forward channel status estimated by the channel status estimator 240, an encoder 110 for encoding transmit data according to the MCS level selected from the MCS level selector 140, a channel interleaver 120 for performing channel-interleaving with respect to transmit bit data according to the MCS level, a modulator 130 for modulating the transmit bit data, which have been subject to the channel interleaving according to the MCS level, and a D-STTD encoder 300 for D-STTD coding transmit symbols obtained through the modulation. In this case, the MCS level selector 140 may constitute the transmitter 100 or the receiver 200. According to the present embodiment, the MCS level selector 140 constitutes the transmitter 100.

The modulator 130 of the transmitter 100 and the demodulator 230 of the receiver 200 can modulate and demodulate signals through a QPSK, 16QAM, or 64QAM modulation scheme.

The encoder 110 and the channel interleaver 120, and the decoder 210 and the channel de-interleaver 220 can perform channel coding and channel decoding through a turbo coding scheme with a coding rate of 1/3 or 1/2.

The channel status estimator 240 estimates the SNR representing the information about the forward channel status by using the receive symbols obtained through the D-STTD decoder 350. The channel status estimator 240 feedbacks the SNR of the forward channel to the transmitter 100.

The MCS level selector 140 selects an MCS level according to the forward channel status feedback from the receiver 200. The encoder 110, the channel interleaver 120, and the modulator 130 channel-code and modulate transmit data according to the selected MCS level. The transmit data are encoded in the D-STTD encoder 300 and transmitted to the transmit antennas Tx. If the channel is in a good status, the MCS level selector 140 selects a higher-order modulation scheme and a higher coding rate (e.g., MCS level 4). As the channel status is deteriorated, the MCS level selector 140 may select a lower-order modulation scheme and a lower-coding rate (e.g., MCS level 1).

Through the above structure, after the transmit data have been subject to channel coding and interleaving processes selected by the MCS level selector 140, the transmit data are modulated through a modulation scheme selected by the MCS level selector 140. The transmit symbols obtained through the modulation are encoded by the D-STTD encoder 300 and transmitted to the M transmit antennas Tx. Signals passing through the channel are detected as receive data, which are estimated values of original symbols, through the D-STTD decoder 350 in the receiver 200. The receive data are recovered through the demodulator 230, the channel de-interleaver 220, and the decoder 210.

Figure 2:
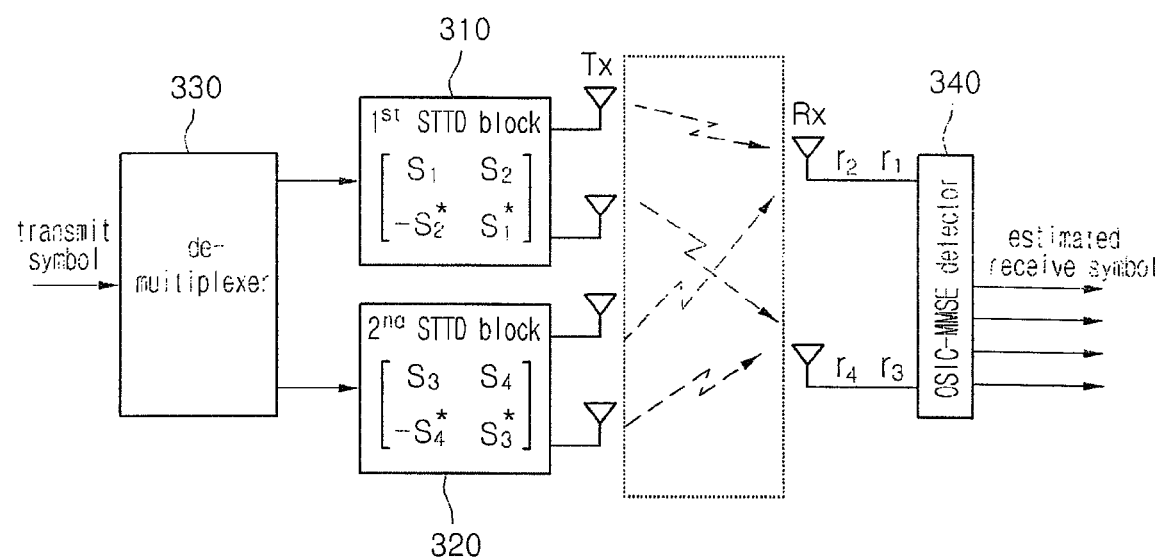
FIG. 2 is a control block diagram showing a D-STTD encoder and a D-STTD decoder of the MIMO communication system according to the embodiment.

FIG. 2 is a control block diagram showing the D-STTD encoder 300 and the D-STTD decoder 350 of the MIMO communication system according to the embodiment.

As shown in FIG. 2, according to the D-STTD technology, two STTDs are connected to each other in parallel, and four transmit antennas Tx and two receive antennas Rx are provided basically.

The D-STTD encoder 300 includes a de-multiplexer 330 for multiplexing signals modulated by the modulator 130 and first and second STTD blocks 310 and 320 used to encode the signals output from the de-multiplexer 330 through the D-STTD scheme.

The D-STTD decoder 350 includes an OSIC-MMSE (Ordered Successive Interference Cancellation—Minimum Mean-Square Error) detector 340 for detecting signals received in the receive antennas Rx. The signals received in the D-STTD decoder 350 can be expressed through following equation.

$$\begin{bmatrix} r_1 \\ r_2^* \\ r_3 \\ r_4^* \end{bmatrix} = \begin{bmatrix} h_{11} & h_{12} & h_{13} & h_{14} \\ h_{12}^* & -h_{11}^* & h_{14}^* & -h_{13}^* \\ h_{21} & h_{22} & h_{23} & h_{24} \\ h_{22}^* & -h_{21}^* & h_{24}^* & -h_{23}^* \end{bmatrix} \begin{bmatrix} s_1 \\ s_2 \\ s_3 \\ s_4 \end{bmatrix} + \begin{bmatrix} n_1 \\ n_2^* \\ n_3 \\ n_4^* \end{bmatrix}$$ <Equation>

In the Equation, the r, h, s, and n represent receive signals, channel responses, transmit signals, and noise, respectively. The channel response is expressed in the form of $h_{ij}$ which means channel response between the $j^{th}$ transmit antenna and the $i^{th}$ receive antenna. The channel responses $h_{ij}$ are independently and identically distributed and follow the zero-mean complex Gaussian distribution. The noise n is AWGN (Additive White Gaussian Noise) representing the mean value of 0 and the variance of $\sigma^2 I$.

According to the above structure, the D-STTD decoder 350 receives signals, which have been transmitted through the four transmit antennas Tx, by the two receive antennas Rx. The D-STTD decoder 350 detects the receive signals by using the OSIC-MMSE detector 340 to output estimated symbol streams to the demodulator 230. The OSIC-MMSE detector 340 parallelizes and extracts receive data as many as the number of the transmit antennas Tx. According to an OSIC algorithm, the OSIC-MMSE detector 340 detects data received in an antenna having a channel representing the lowest error probability. Next, after removing the data from whole received data, the OSIC-MMSE detector 340 detects received data of an antenna representing the next lowest probability until all data, which have been transmitted, are detected.

Figure 3:
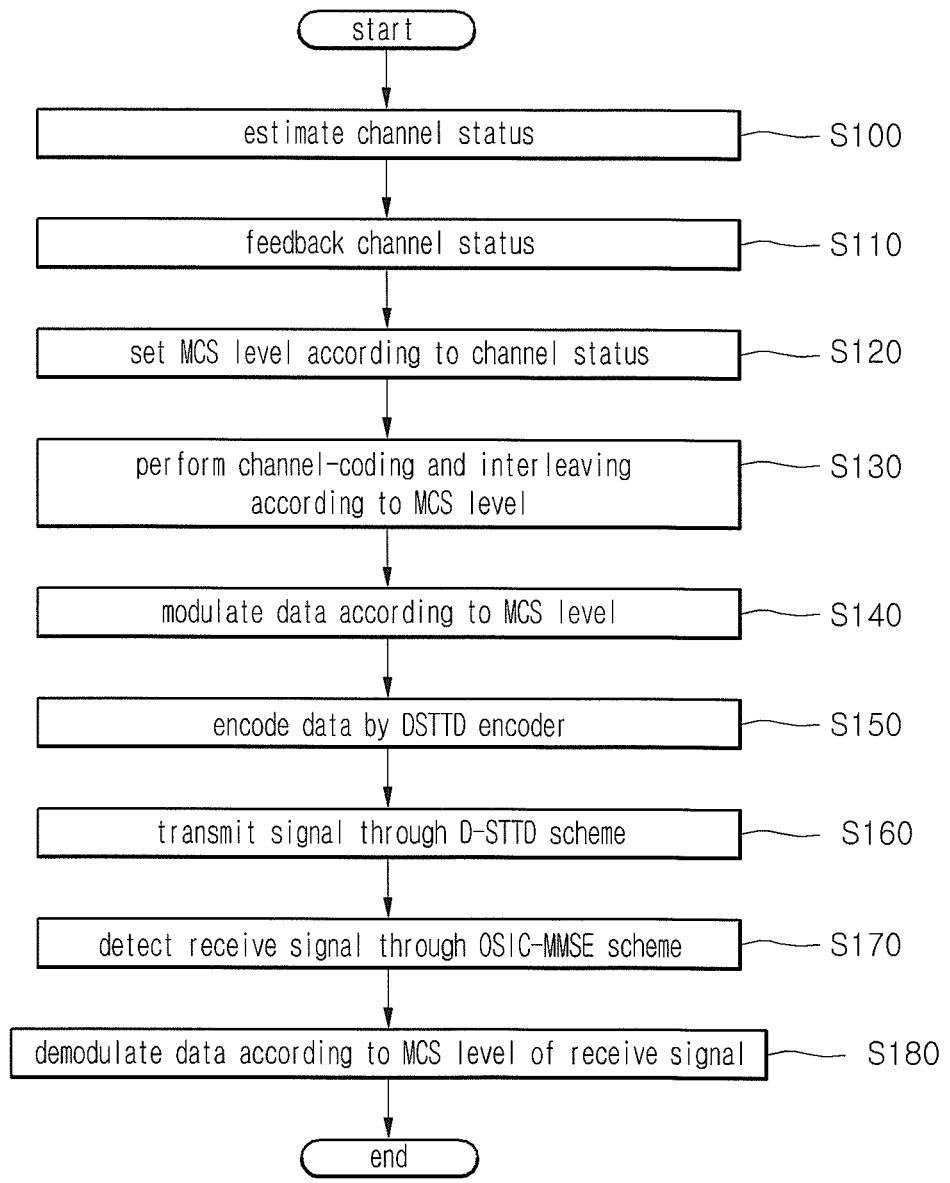
FIG. 3 is a control flowchart of the MIMO communication system according to the embodiment.

FIG. 3 is a control flowchart of the MIMO communication system according to the embodiment.

The channel status estimator 240 of the receiver 200 STTD-decodes signals received through the receive antennas Rx to estimate the forward channel status (step S100). In this case, the channel status estimator 240 can estimate the SNR representing the information about the forward channel status.

The channel status estimator 240 of the receiver 200 feedbacks the estimated forward channel status to the transmitter 100 (step S110).

Figure 4:
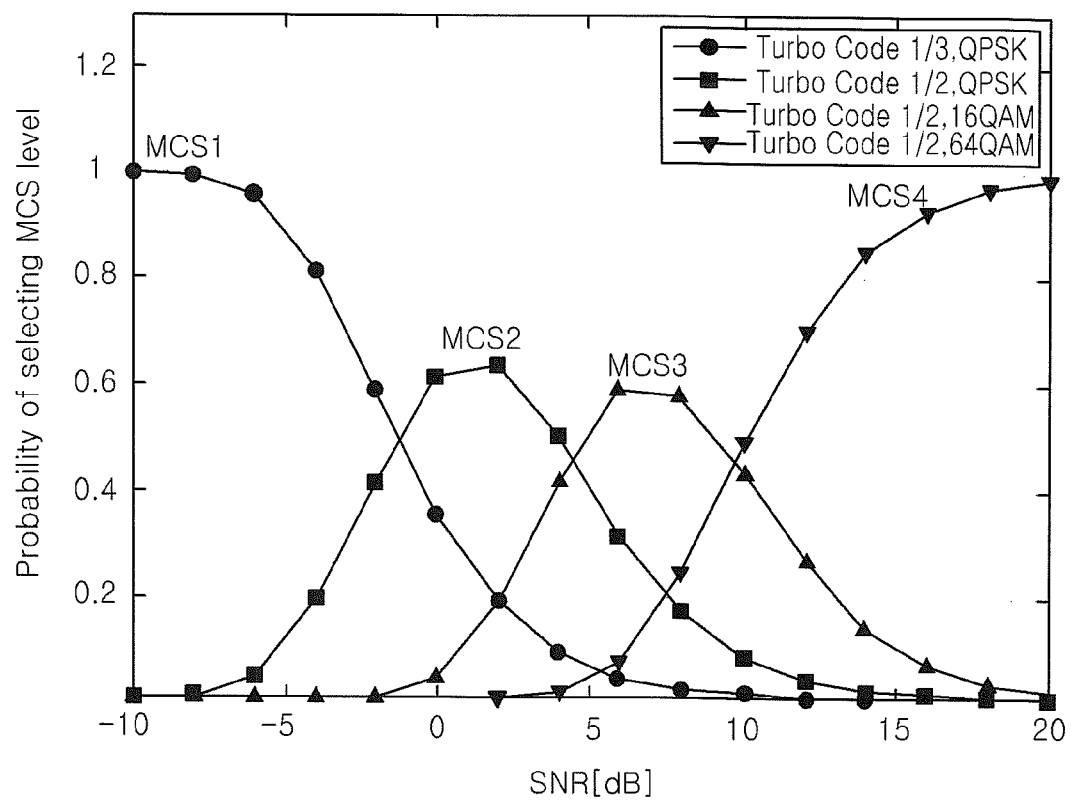
FIG. 4 is a graph showing a simulation for the probability for selecting MCS levels in the MIMO communication system according to the embodiment.

The MCS level selector 140 of the transmitter 100 selects an MCS level according to received information about the forward channel status (step S120). FIG. 4 is a graph showing a simulation for the probability for selecting MCS levels in the MIMO communication system according to the embodiment. The graph represents the probability of selecting the MCS level converted based on the overall probability normalized to 1 in a D-STTD 4×2 communication system with the AMC scheme under a Rayleigh Flat Fading Environment. As shown in FIG. 4, the probability of selecting the MCS level 1 is the highest at the low SNR. In other words, if a channel is not in a good status, 1/3 turbo coding and QPSK modulation schemes representing a lower-order modulation scheme and a lower coding rate are used. In contrast, the probability of selecting the MCS level 4 is the highest at the high SNR. In other words, if the channel is in the good status, 1/2 turbo coding and 64 QSM modulation schemes representing a higher-order modulation scheme and a higher coding rate are used.

The transmitter 100 codes and interleaves transmit data of forward channels based on the selected MCS level (step S130).

The transmitter 100 modulates the transmit data of the forward channels based on the selected MCS level (step S140).

After encoding the modulated data through the D-STTD scheme (step S150), the transmitter 100 transmits the modulated data based on the D-STTD scheme by the transmit antennas Tx (step S160).

The receiver 200 detects receive data received in the receive antennas Rx through the OSIC-MMSE scheme (step S170).

After decoding and de-interleaving detected data, the receiver 200 demodulates the data (step S180). In this case, the receiver 200 can demodulate the receive data according the MCS level, which is selected by the transmitter 100, through coding and modulation schemes corresponding to the MCS level.

As described above, according to the present embodiment, the transmitter 100 selects an MCS level according to each SNR environment and transmits data including the MCS level. The receiver 200 detects receive data through the OSIC-MMSE scheme and demodulates the receive data through decoding and demodulation schemes corresponding to the transmitted MCS level.

Figure 5:
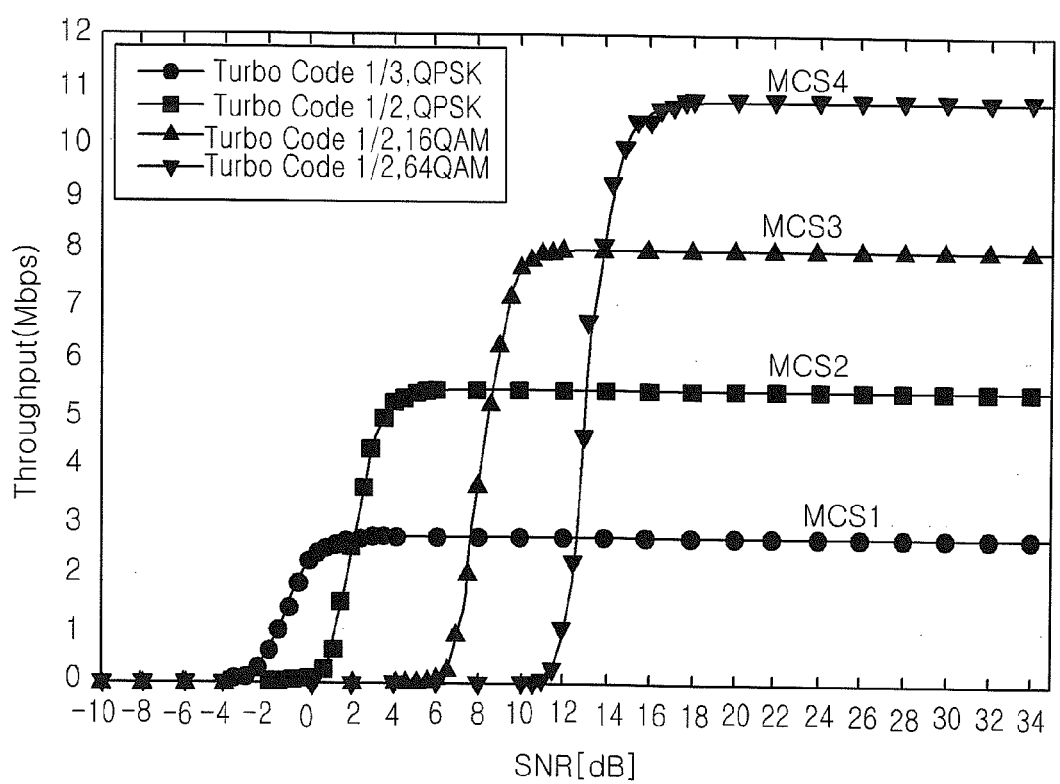
FIG. 5 is a graph showing a simulation result for the throughput according to MCS levels in the MIMO communication system according to the embodiment.

FIG. 5 is a graph showing a simulation result for the throughput according to MCS levels when the transmission function is performed according to the embodiment. The graph of FIG. 5 represents the performance of the throughput in the D-STTD 4×2 communication system under the Rayleigh Flat Fading environment.

When the MCS level 1 (QPSK, turbo code of 1/3) is applied, data are received without a frame error at the maximum transmission rate at the SNR of about 2 dB or more. When the MCS level 4 (QPSK, turbo code of 1/2) is applied, data are received without a frame error at the maximum transmission rate at the SNR of about 18 dB or more. In the case of the coding rate or the modulation scheme corresponding to the MCS level 3 or the MCS level 4, frame error probability is very high at a low SNR duration, but a high transmission rate can be ensured without the frame error at the high SNR duration.

Therefore, the MIMO communication system according to the embodiment selects an MCS level according to SNRs. Accordingly, data can be transmitted/received without a frame error at most of SNRs. In other words, the most effective throughput can be ensured even at a certain SNR.

Figure 6:
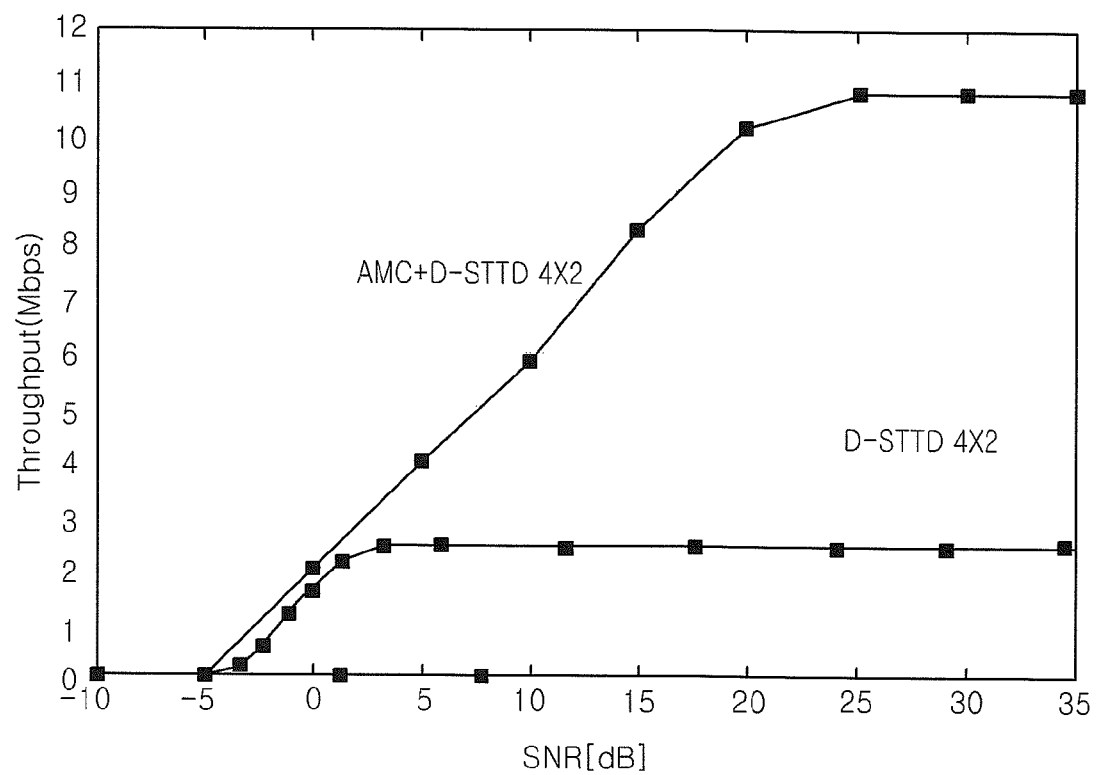
FIG. 6 is a graph showing a simulation result for the performance of throughputs in a conventional communication system and the MIMO communication system according to the embodiment.

FIG. 6 is a graph showing a simulation result for the performance of the throughputs in a conventional communication system and the MIMO communication system according to the embodiment. In detail, FIG. 6 is a graph showing the simulation for the performance of the throughputs in the D-STTD 4×2 communication system with the AMC scheme according to the embodiment and the conventional D-STTD 4×2 system under the Rayleigh Flat Fading environment. In the graph, the horizontal axis represents an SNR (dB), and the vertical axis represents the maximum throughput (Mbps).

As shown in FIG. 6, the D-STTD 4×2 communication system with the AMC scheme according to the embodiment represents the maximum throughput of about 10.9 Mbps, but the conventional D-STTD 4×2 system represents the maximum throughput of about 2.7 Mbps. In other words, in the D-STTD 4×2 communication system with the AMC scheme according to the embodiment, the maximum throughput is significantly increased.

When comparing with the conventional D-STTD 4×2 system, the D-STTD 4×2 communication system with the AMC scheme according to the embodiment represents the uniform throughput over the whole SNR durations.

Figure 7:
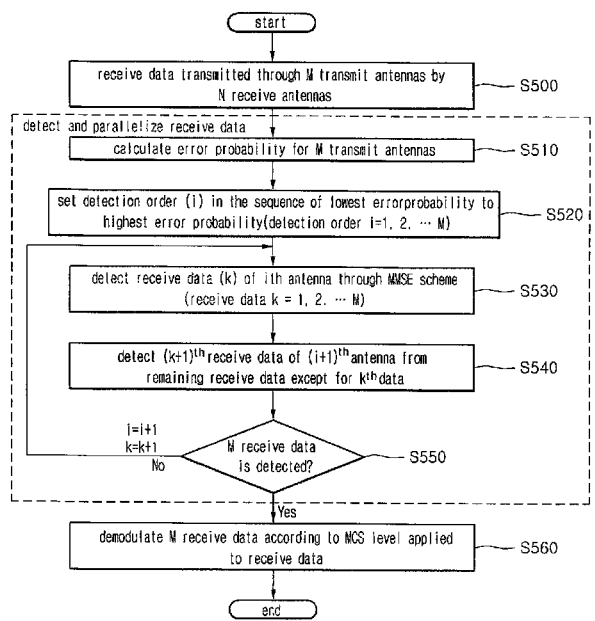
FIG. 7 is a control flowchart for data reception in the MIMO communication system according to the embodiment.

FIG. 7 is a control flowchart showing the MIMO communication system performing the reception function according to the embodiment. In this case, the MIMO communication system may be equipped with the AMC scheme and an M×N D-STTD scheme.

The receiver 200 receives data, which have been transmitted through M transmit antennas Tx, by N receive antennas Rx (step S500).

The receiver 200 can detect the receive data through the OSIC-MMSE scheme. The OSIC-MMSE detector 340 of the receiver 200 calculates error probability for each of the M transmit antennas Tx (step S510). In this case, the error probability can be calculated based on an SINR (signal-to-interference ratio) value, and data detection order can be determined in the sequence of channels representing the highest SINR to the lowest SINR.

The OSIC-MMSE detector 340 of the receiver 200 sets the detection order i in the sequence of the channels representing the lowest error probability to the highest error probability (step S520). The detection order for the M transmit antennas Tx is set from 1 to M.

The OSIC-MMSE detector 340 of the receiver 200 detects receive data k received therein from an $i^{th}$ transmit antenna Tx through the MMSE scheme according to the detection order (step S530). Therefore, the received data detected in the first stage are data which have been transmitted through the transmit antenna Tx representing the lowest error probability. The MMSE scheme is an algorithm to minimize the error between a transmit vector and an estimation vector. According to the MMSE scheme, original transmit signals can be detected by removing the inference between signals received in each receive antennas Rx.

The OSIC-MMSE detector 340 of the receiver 200 removes data k, which has been detected, from the whole receive data, and detects data k+1 of an $(i+1)^{th}$ antenna having the next detection order from the received data without the data k (step S540).

The OSIC-MMSE detector 340 of the receiver 200 determines if M receive data are detected (step S550) and then repeatedly detects the receive data until all of the M receive data are detected.

Meanwhile, if all of the M receive data are detected, the receiver 200 decodes and demodulates each receive data according to the MCS level applied for the receive data to recover the receive data into original data (step S560).

As described above, the MIMO communication system according to the embodiment can detect receive signals through the OSIC-MMSE scheme.

Figure 8:
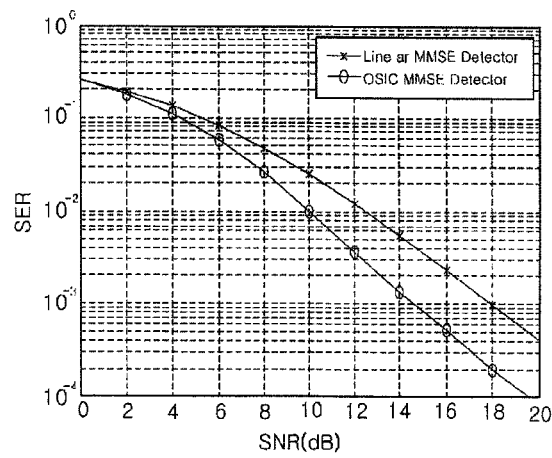
FIG. 8 is a graph showing simulation results for the channel performance of a method of controlling the MIMO communication system according to the embodiment and a conventional signal detection method.

FIG. 8 is a graph showing simulation results for the channel performance of a method of controlling the MIMO communication system according to the embodiment and a conventional signal detection method.

The MIMO communication system for the simulation is a D-STTD 4×2 communication system with the AMC scheme including four transmit antennas Tx and two receive antennas Rx. FIG. 8 shows simulations for the OSIC-MMSE detection method according to the embodiment and the conventional linear MMSE detection method when the MIMO communication system makes data communication under the Rayleigh Flat Fading environment.

As shown in FIG. 8, the OSIC-MMSE detection method represents the throughput 1 dB to 2 dB higher than that of the conventional linear MMSE detection method at a low SNR duration. In particular, the OSIC-MMSE detection method represents the throughput about 3.5 dB higher than that of the conventional linear MMSE detection method at a high SNR duration.

Figure 9:
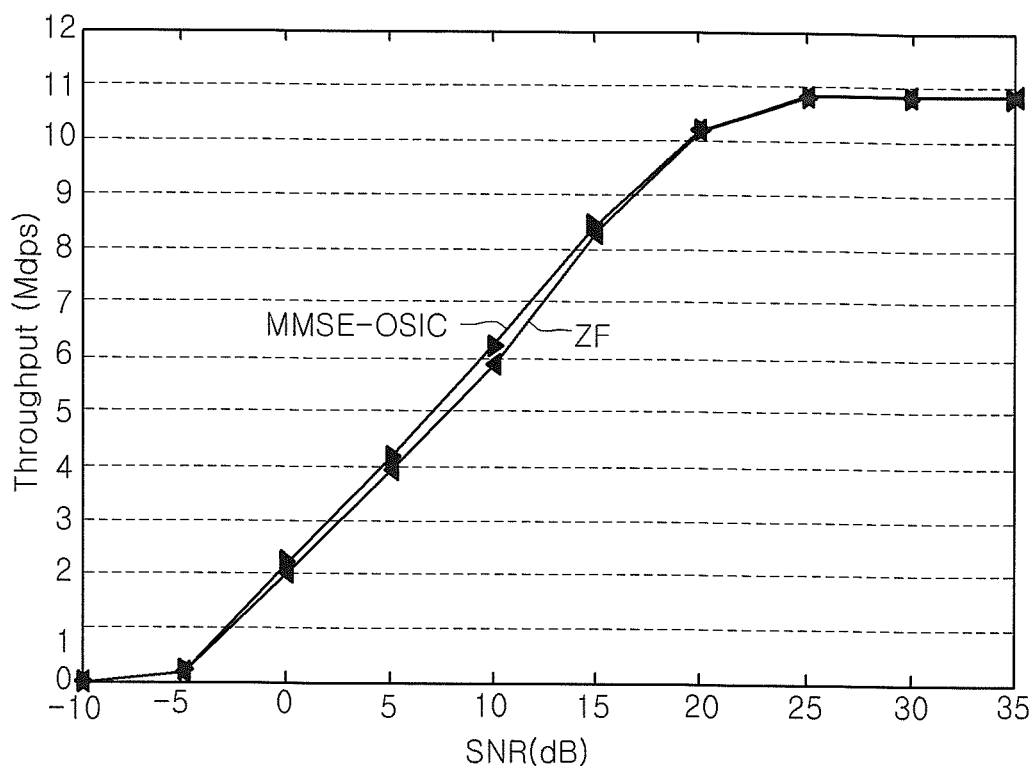
FIG. 9 is a graph showing simulation results for the throughput performance of the conventional signal detection method and the signal detection method according to the embodiment.

FIG. 9 is a graph showing simulation results for the throughput performance of the conventional signal detection method and the signal detection method according to the embodiment.

The MIMO communication system for the simulation is a D-STTD 4×2 communication system with the AMC scheme including four transmit antennas Tx and two receive antennas Rx. In other words, FIG. 9 shows simulations for the throughput performance in the OSIC-MMSE detection method according to the embodiment and the ZF (Zero-Forcing) detection method when the MIMO communication system makes data communication under the Rayleigh Flat Fading environment.

As shown in FIG. 9, the throughput performance difference of about 355 kpbs is represented at the SNR duration of about 10 dB. Accordingly, when comparing with the ZF algorithm, the OSIC-MMSE detection algorithm represents superior BER, or SER performance.

As described above, the MIMO communication system according to the embodiment selects the MCS level according to the SNR information when performing a transmission function. Therefore, the channel coding rate and the modulation scheme are dynamically applied according to the channel response statuses, so that the most effective throughput can be ensured at a certain SNR. When the receive function is performed, data are detected through the OSIC-MMSE scheme, and receive data are demodulated through decoding and demodulation schemes corresponding to the MCS level which has been transmitted. Accordingly, the receive performance can be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

The present invention is applicable to multiple input multiple output communication.

The invention claimed is:
1. A method of a multiple input multiple output communication system, comprising:
receiving, by N receive antennas at a receiver, N being an integer greater than 1, data, which have been coded through a double-space time transmit diversity (D-STTD) scheme and transmitted through M transmit antennas from a transmitter, M being an integer greater than 1;
detecting, at the receiver, the received data through an ordered successive interference cancellation-minimum mean-square error (OSIC-MMSE) scheme, and parallelizing M received data; and
decoding, at the receiver, the received data, which has been parallelized, through the modulation and coding schemes that has been applied to the received data,
wherein the detecting the received data through the OSIC-MMSE scheme and parallelizing the M received data comprises:
calculating error probability for each of the M transmit antennas;
setting a detection order of the received data in sequence of the transmit antennas representing lowest error probability to the transmit antennas representing highest error probability;

detecting the received data from each transmit antenna according to the detection order; and detecting the received data having a next detection order from the received data except for the received data that has been detected.

2. The method of claim 1, wherein the detecting the received data having a next detection order from the received data except for the received data that has been detected is repeated until the M received data are detected.

3. The method of claim 1, wherein the detecting the received data from each transmit antenna according to the detection order comprises detecting the received data through an MMSE scheme.

4. The method of claim 1, further comprising:
estimating, at the receiver, a signal to noise ratio (SNR) of the received data received through one of the N receive antennas; and
selecting, at the receiver, a modulation and coding scheme (MCS) level, which represents combination of the modulation and coding schemes applied to the received data, according to the SNR.

5. The method of claim 4, wherein the decoding the received data, which has been parallelized, through the modulation and coding schemes that has been applied to the received data comprises decoding the received data according to the modulation and coding schemes corresponding to the MCS level.

6. The method of claim 1, further comprising:
selecting, at the transmitter, a modulation and coding scheme (MCS) level representing a combination of the modulation and coding schemes according to a status of a channel;
processing, at the transmitter, data according to the modulation and coding schemes corresponding to the MCS level; and
coding, at the transmitter, the data, which has been modulated and coded, through the D-STTD scheme and transmitting, at the transmitter, the data through the M transmit antennas to the receiver.

7. The method of claim 6, wherein the selecting the MCS level according to the status of the channel comprises:
estimating a signal to noise ratio (SNR) of a receive signal received through the channel; and
selecting the MCS level such that at least one of a coding rate of the coding scheme and a modulation order of the modulation scheme is increased as the SNR of the channel is increased.

8. A multiple input multiple output communication system comprising:
a transmitter for transmitting data coded through a double-space time transmit diversity (D-STTD) scheme by M transmit antennas, M being an integer greater than 1; and
a receiver for receiving the data through N receive antennas from the transmitter, N being an integer greater than 1 and comprising a D-STTD decoder for detecting the received data through an ordered successive interference cancellation-minimum mean-square error (OSIC-MMSE) scheme, parallelizing M received data, and decoding the received data, which has been parallelized, through the modulation and coding schemes that have been applied to the received data,
wherein the D-STTD decoder calculates error probability for each of the M transmit antennas, sets a detection order of the received data in sequence of the transmit antennas representing lowest error probability to the transmit antennas representing highest error probability, detects the received data from each transmit antenna according to the detection order, and detects the received data having a next detection order from the received data except for the received data that has been detected.

9. The system of claim 8, wherein the D-STTD decoder repeatedly detects the received data having a next detection order from the received data except for the received data that has been detected until the M received data are detected.

10. The system of claim 8, wherein the D-STTD decoder detects the received data from each transmit antenna according to the detection order through an MMSE scheme.

11. The system of claim 8, wherein the receiver further comprises a channel status estimator for estimating a signal to noise ratio (SNR) of the received data received through one of the N receive antennas,
wherein the D-STTD decoder selects a modulation and coding scheme (MCS) level, which represents combination of the modulation and coding schemes applied to the received data, according to the SNR.

12. The system of claim 11, wherein the D-STTD decoder decodes the received data according to the modulation and coding schemes corresponding to the MCS level.

13. The system of claim 8, wherein the transmitter comprises:
a modulation and coding scheme (MCS) level selector for selecting an MCS level representing combination of the modulation and coding schemes according to a status of a channel;
a modulation and coding section for processing data according to the modulation and coding schemes corresponding to the selected MCS level; and
a D-STTD encoder for coding the data, which has been processed through the modulation and coding section, through a D-STTD scheme and transmitting the data through the M transmit antennas to the receiver.

14. The system of claim 13, wherein the transmitter further comprises a channel status estimator for estimating a signal to noise ratio (SNR) of a received signal and providing the SNR to the MCS level selector.

15. The system of claim 14, wherein the MCS level selector selects the MCS level, such that at least one of a coding rate of the coding scheme and a modulation order of the modulation scheme is increased as the SNR of the channel is increased.

* * * * *